Oct. 11, 1932.  J. F. MALM  1,881,786
MEANS FOR MEASURING GREASE
Filed July 19, 1930  2 Sheets-Sheet 1
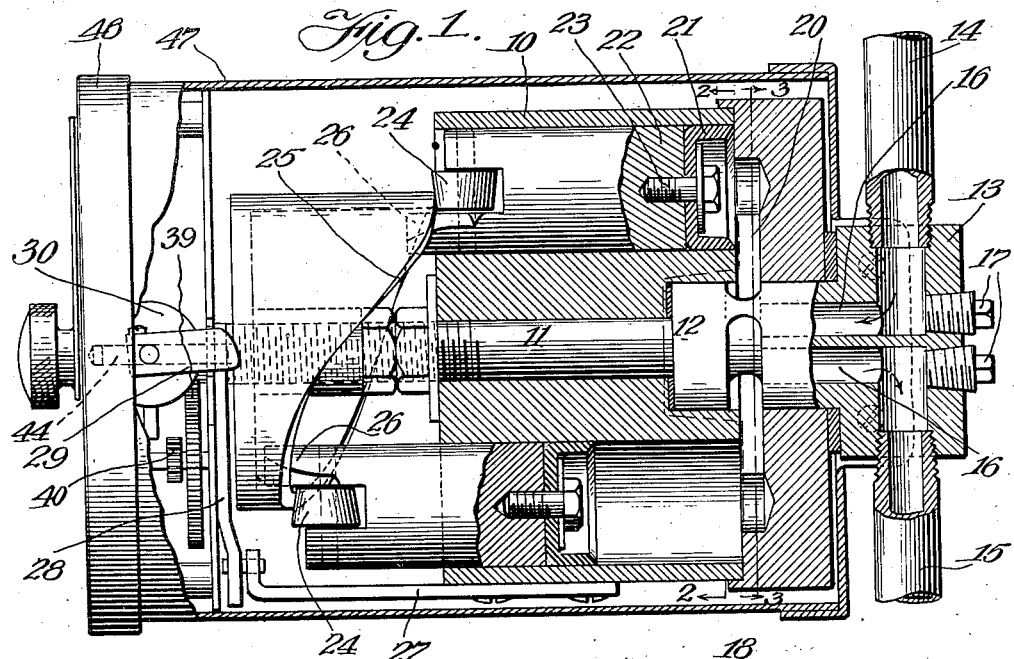
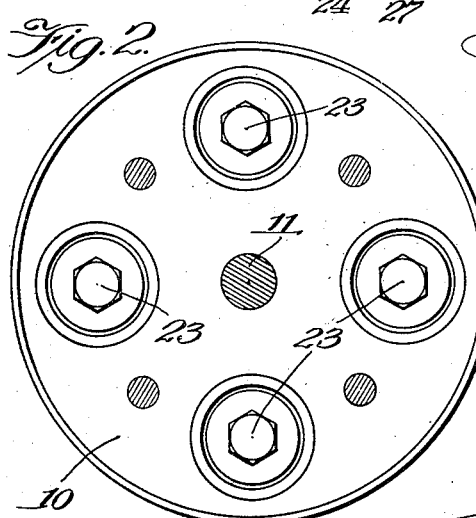
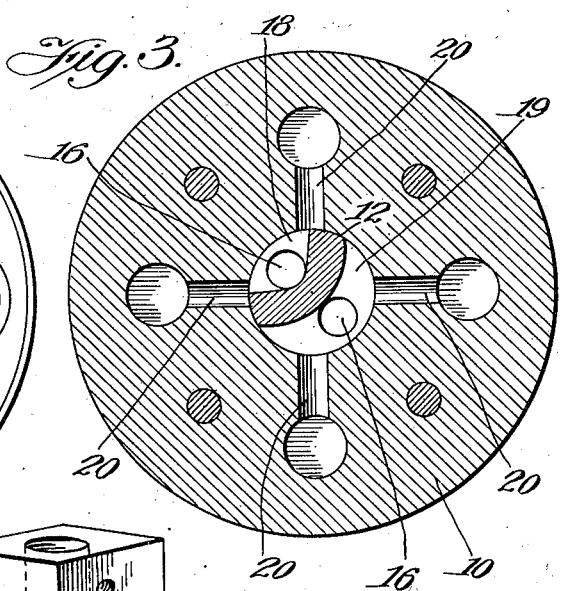
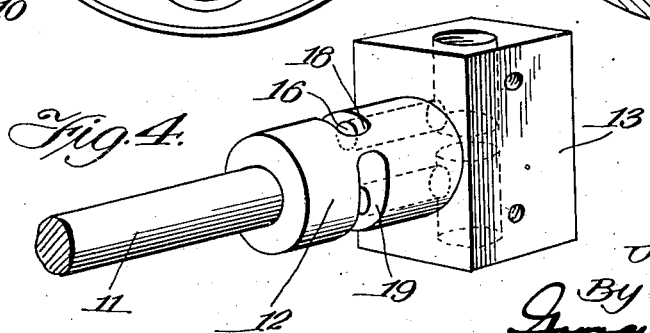
Inventor:
John F. Malm.

Oct. 11, 1932.    J. F. MALM    1,881,786

MEANS FOR MEASURING GREASE

Filed July 19, 1930    2 Sheets-Sheet 2

Inventor:
John F. Malm

Patented Oct. 11, 1932

1,881,786

UNITED STATES PATENT OFFICE

JOHN F. MALM, OF CHICAGO, ILLINOIS

MEANS FOR MEASURING GREASE

Application filed July 19, 1930. Serial No. 469,050.

My invention relates to means for measuring grease such as is used in the housing which contains the differential gear mechanism of automobiles. Although referred to herein as a grease meter the device is adapted for use with other materials having the proper consistency such as various liquids.

In the drawings wherein I have illustrated one embodiment of the invention:

Fig. 1 is a central sectional elevation.

Fig. 2 is a section on the line 2—2 of Fig. 1.

Fig. 3 is a section on the line of 3—3 of Fig. 1.

Fig. 4 is a perspective view of a detail.

Figure 5:
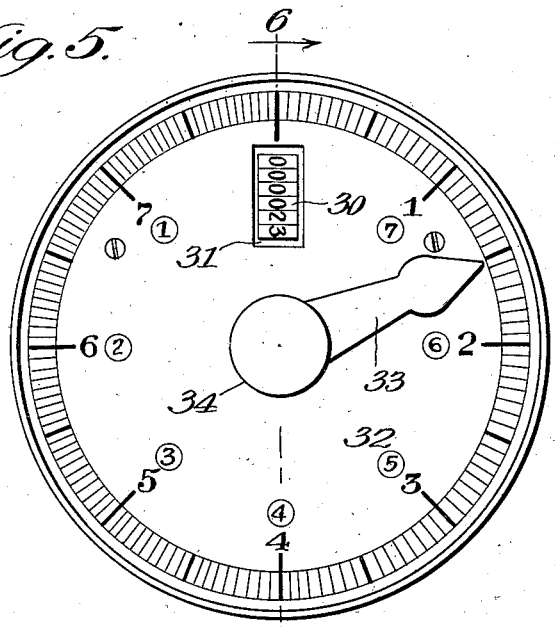
Fig. 5 is a top view.

In the form illustrated, the device consists of a cylindrical block of metal having four cylindrical openings spaced equal distances from the longitudinal axis of said cylindrical block and equal distances from each other. Each opening or chamber has a piston therein carrying a roller at its upper end. A cylindrical cam member is mounted above said block on a stationary shaft passing through a central opening in said block, said shaft having a cylindrical enlargement at its lower end provided with inlet and outlet recesses therein, communicating with ports in said block leading to the lower end of each chamber below the piston therein.

The block itself is rotatable about said stationary shaft with the result that when grease is forced through the proper ports beneath whichever piston is in lowermost position, the latter is raised, and the roller above said piston, being always in engagement with the cam surface, rides helically around said cam, thereby rotating said block and bringing the next successive piston into position to have communication established with the incoming grease and thus be raised also. The upward movement of said first piston rotates the block about a quarter turn, the upward movement of the next piston rotates it another quarter turn and so on, the four pistons insuring a complete rotation. As each roller rides down the opposite side of the cam, being forced downward by the curvature of said cam and the continued rotation of said block, the grease beneath the corresponding piston is forced out through the outlet port into a tube or hose which discharges into the differential casing or elsewhere. A train of gears, connected with a pointer, and a counter are operated by the rotation of said block and indicate the amount of grease passing through the meter. The device can be operated in any position, but is operated most conveniently in upright position, i. e., with the dial on the top, and for convenient reference in describing the structure certain parts are designated as upper, lower, etc., these terms being used in a relative sense only.

Describing the device more in detail, a cylindrical block 10, as shown in Fig. 1, is rotatable about a vertical shaft 11, which shaft has a cylindrical enlargement 12 at its lower end and a further enlargement 13 below the same constituting what may be considered a fixed base or support. An inlet pipe 14 is connected to an opening in one side of the base 13 and an outlet pipe 15 is connected to the other side thereof. Vertical openings 16, 16 communicate with said inlet and outlet pipes 14 and 15 as shown in Fig. 1. These vertical openings are made preferably by drilling holes in the block 13, the lower end of said holes being closed by plugs 17.

The upper ends of said holes communicate with ports 18 and 19 in the cylindrical enlargement 12, as shown more fully in Figs. 3 and 4. Port 18 extends about a quarter of the distance around cylinder 12. Port 19 extends more than half way around the same. These ports are brought into communication with radial ports 20 in block 10 as the latter rotates.

Assuming the grease is being pumped into the meter through pipe 14, it will be seen from Fig. 1 that said grease is forced upward through right hand opening 16 and port 18 and thence through the right hand port 20, beneath the piston 21 which is a cup-shaped member secured to a cylindrical block 22 by a stud 23. A roller 24 is mounted in the upper end of the block 22 and bears against the cylindrical cam 25. As the grease raises the piston 21, the block rotates about a quarter turn thus bringing the next piston chamber into communication with the port 18 through the next port 20. In the meantime, the roller 24, above the first piston described, has reached its highest point about the end of the quarter turn, and is pushed downward during continual rotation of the block, thus expelling the grease beneath it through the radial port 20, the outlet port 19, the vertical passage 16 and outlet pipe 15.

The outlet port 19 is sufficiently large to insure communication with one of the radial ports 20 while the block is turning more than a half turn, and thus as shown two of the cylinders may discharge grease through said port 19 at the same time and in fact three of them may be momentarily connected with said port. The resistance encountered by the grease, in and at the end of the pipe or hose 15 is considerably less than the pressure applied to the grease by the pump (not shown) to cause it to enter the meter through pipe 14, and thus the upper pressure against any one piston is considerably reduced as soon as the block has turned far enough to cut off communication between the chamber below said piston and the inlet port 16. Thus the difference in pressure beneath a piston on one side of the meter and on the other side thereof is ample to insure a continued rotation of the block.

Each cylindrical block 22 has an extension 26 at the upper end thereof adjacent to the roller 24 which extension fits within the cylindrical cam member 25 and thus maintains the roller 24 with its axis always radial with respect with the vertical shaft 11, thereby causing the rollers to run smoothly around the cam whereas otherwise there would be a relative twisting movement.

The rotation of block 10 is communicated to a suitable counter by member 27 secured to the side of said block which rotates the radial arm 28, the outer end of which is forked to receive the upper end of said member and which, in turning, strikes a depending arm 29 thus operating a counter 30. As shown in Fig. 5, this counter is visible through an opening 31 in the dial 32 on top of the device.

The dial may have any convenient numbering system thereon such as the one shown and a pointer 33 may be swung around the dial by means of the knurled handle 34 to indicate the amount of grease, in pounds for example, which the purchaser desires. As the pump is operated to pump the grease through the meter, into a differential casing for example, the pointer 33 is moved back to zero position at which point the pumping is stopped.

The pointer may be driven by any suitable gear train of which the following is an example: Knurled knob 34 has a downwardly extending sleeve 35 thereon with a gear 36 fixed to its lower end. This gear is driven by a pinion 37 on a shaft 38 which shaft carries also gear 39 driven by a pinion 40 on another shaft 41, the latter shaft carrying gear 42 driven by a pinion 43 which is fixed to and rotates with radial arm 28 previously described. Thus as the arm 28 rotates with the block 10, the pointer 33 rotates slowly through the reduction gearing described.

Figure 6:
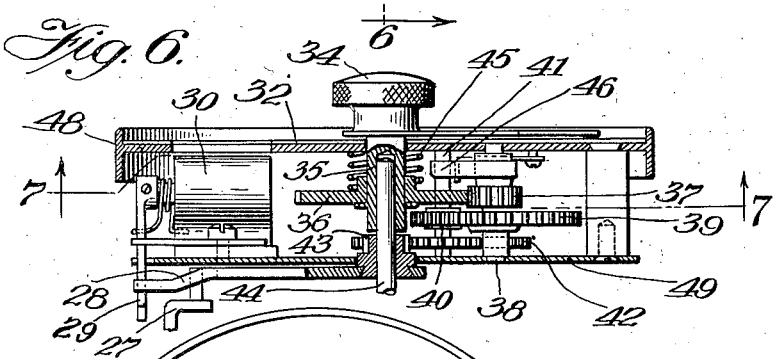
Fig. 6 is a section on the line 6—6 of Fig. 5.
Figure 7:
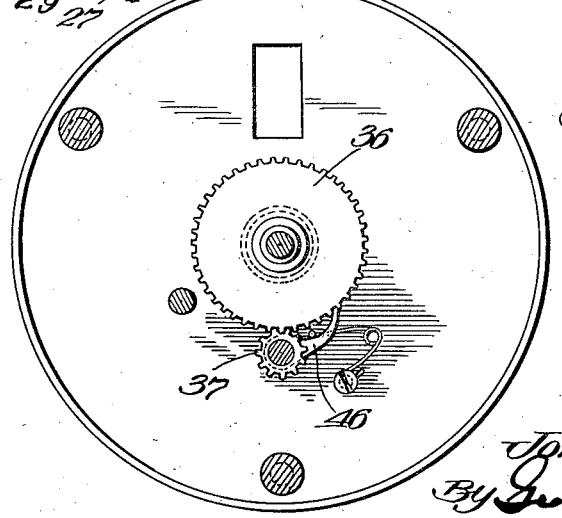
Fig. 7 is a section on the line 7—7 of Fig. 6.

Provision is made for lifting the gear 36 from the pinion 37 in order to turn the pointer 33 by hand independently of the gear train. For this purpose, it will be noted that the sleeve 35 may be slid up and down on the spindle 44 which projects from the top of the shaft 11. A spring 45 surrounds the sleeve 35 and normally holds the latter in lowermost position but it may be pulled upwardly by the knob 34 and turned to swing the pointer in a clock-wise direction, as viewed in Fig. 5. It is impossible to swing the pointer in the opposite direction because of a ratchet 46 shown in Figs. 6 and 7, which ratchet is normally above the gear 36 and out of engagement therewith but which engages the teeth of said gear when the latter is lifted. With this arrangement it will be seen that it is impossible to defraud the customer by pushing the pointer back toward the zero position after it has been set and before the pump is operated or during the operation thereof, as the pawl 46 prevents such reverse rotation when the knob and pointer are lifted, and the engagement between gear 36 and pinion 37 prevents such movement when said parts are in their normal lower position, except, of course, that the pointer may be rotated slowly in a legitimate manner as the grease is flowing through the meter.

As shown in Fig. 5, I provide also a second series of numbers on the dial, running in the opposite direction to those previously described. The purpose of this is to permit a customer to be supplied with a certain amount of grease without knowing in advance just how much is needed. If the pointer is assumed to be at zero position, and the meter is operated to move said pointer in counter-clockwise direction over the scale, then the second series of numbers will indicate the amount of grease put into the differential whenever the meter is stopped. To restore the pointer to initial position, it must then be turned by hand in clockwise direction to the zero position to properly indicate the next transaction by operating in the manner just described. However, if another or subsequent customer wishes a definite amount of grease, for example, three pounds, the pointer is first pushed further in a clockwise direction to numeral 3 on the main scale, and when the meter is operated, the pointer moves backward as the pumping continues, until the pointer reaches zero position.

The meter parts are preferably enclosed in a cylindrical casing 47 as shown in Fig. 1, having an upper cap 48 which carries the train of gears and counter between itself and a disc 49 whereby this mechanism may be readily lifted off with the cap.

It will be understood, of course, that the description of a block having four chambers, four radial ports and an equal number of associated parts is merely by way of description of the commercial embodiment of the invention, as said invention is not limited to any particular number of chambers and pistons. Neither is it desired to limit the invention by the use of the terms upper, lower, radial, etc., in the description or in the claims, such terms being used as a matter of convenience and in a relative sense, as the device may be operated in any position. Various other changes may be made in the mechanism without parting from the spirit of the invention.

I claim as my invention:

1. A measuring device of the class described comprising a stationary member having a port therein, a rotatable member having chambers with ports which register with said first port one after the other, when said second member rotates, pistons slidable in said chambers in said second member in a direction parallel to the axis of rotation, a cam, and means associated with each piston to engage said cam whereby liquid forced through the port in said stationary member, into a port in said rotatable member, will move the corresponding piston and rotate said rotatable member with respect to said cam.

2. A measuring device, of the class described comprising a stationary member having inlet and outlet ports therein, a rotatable member having chambers with ports which register with said first ports one after the other, when said second member rotates, pistons slidable in said chambers in said second member in a direction parallel to the axis of rotation, a stationary cam, and means associated with each piston to engage said cam whereby liquid forced through the inlet port in said rotatable member, will move the corresponding piston and rotate said rotatable member with respect to said cam, the latter serving also to restore said piston to its initial position and thus expel said liquid through said outlet port.

3. In a grease meter comprising a stationary base with inlet and outlet ports therein, a stationary shaft extending therefrom, a block rotatable about said shaft and having chambers therein, a cylindrical fixed cam on said shaft, pistons movable in said chambers in a direction parallel to the axis of rotation, rollers associated with said pistons to engage said cam, said block having ports arranged to establish communication between said first ports and said piston chambers as said block rotates, and indicating means actuated by the rotation of said block.

4. In a grease meter, a stationary base, a cylindrical extension on said base and having inlet and outlet ports opening through the sides thereof, said outlet port extending more then half way around said cylindrical extension and said inlet port occupying less than the remainder of the circumference, a block having a cylindrical opening fitting said cylindrical extension and having radial ports therein communicating with said inlet and outlet ports as said block rotates, said block having chambers communicating with said radial ports, pistons movable in a direction parallel to the axis of rotation in said chambers, and means actuated by the movement of said pistons for causing such rotation.

5. In a grease meter, a central stationary shaft, a block rotatable about said shaft and having cylindrical chambers therein, pistons slidable in said chambers in a direction parallel to the axis of rotation, a cylindrical fixed cam mounted on said shaft, a roller associated with each piston, a guide flange associated with each piston and projecting into said cylindrical cam to maintain said rollers thereon, and means for conducting grease to said chambers whereby said pistons may be moved thereby.

In testimony whereof, I have subscribed my name.

JOHN F. MALM.